United States Patent
Eckle et al.

(10) Patent No.: US 10,137,801 B2
(45) Date of Patent: Nov. 27, 2018

(54) CONDUCTOR LINE, CURRENT COLLECTOR, AND CONDUCTOR LINE SYSTEM

(71) Applicant: CONDUCTIX-WAMPLER GMBH, Weil am Rhein (DE)

(72) Inventors: Michael Eckle, Müllheim (DE); Bernd Maier, Schlingen (DE)

(73) Assignee: CONDUCTIX-WAMPFLER GMBH, Weil am Rhein (DE)

( * ) Notice: Subject to any disclaimer, the term of this patent is extended or adjusted under 35 U.S.C. 154(b) by 212 days.

(21) Appl. No.: 14/898,622

(22) PCT Filed: Mar. 23, 2015

(86) PCT No.: PCT/EP2015/056104
§ 371 (c)(1),
(2) Date: Dec. 15, 2015

(87) PCT Pub. No.: WO2015/180855
PCT Pub. Date: Dec. 3, 2015

(65) Prior Publication Data
US 2016/0137101 A1    May 19, 2016

(30) Foreign Application Priority Data

May 27, 2014  (DE) .......... 10 2014 107 466

(51) Int. Cl.
*B60M 1/34* (2006.01)
*B60L 5/40* (2006.01)
(Continued)

(52) U.S. Cl.
CPC .......... *B60M 1/34* (2013.01); *B60L 5/40* (2013.01); *H01B 5/08* (2013.01); *H01P 3/12* (2013.01)

(58) Field of Classification Search
CPC .... B60L 1/00; B60L 5/00; B60L 5/005; B60L 5/04; B60L 5/18; B60M 1/00; B60M 1/02;
(Continued)

(56) References Cited

U.S. PATENT DOCUMENTS

| 2,668,199 A | 2/1954 | Connell |
| 4,331,959 A | 5/1982 | Brauer et al. |

(Continued)

FOREIGN PATENT DOCUMENTS

| DE | 2555909 | 6/1978 |
| DE | 2918178 | 11/1980 |

(Continued)

OTHER PUBLICATIONS

International Search Report dated Jun. 3, 2015 for PCT/EP2015/056104, filed Mar. 23, 2015.

(Continued)

*Primary Examiner* — Robert J McCarry, Jr.
(74) *Attorney, Agent, or Firm* — Paul D. Bianco; Katherine Davis; Fleit Gibbons Gutman Bongini & Bianco, PL (57) ABSTRACT

A conductor line for supplying at least one electric load which can be moved on the conductor line in the longitudinal direction of the conductor line includes at least one conductor strand which runs in the longitudinal direction and which has an electrically conductive profiled conductor section for contacting a sliding contact of the load, and at least one signal transmission device which runs in the longitudinal direction. A current collector for the load has at least one sliding contact for contacting the profiled conductor section of the conductor strand of the conductor line and at least one antenna for transmitting data to a conductor line signal transmission device, which moves in the longitudinal (Continued)

direction. A conductor line system includes such a conductor line and current collector. An aim is to allow a compact and material-saving design as well as a good fault-tolerant transmission. This is achieved by a conductor line in which the signal transmission device and the profiled conductor section are designed as one component, by a current collector in which the sliding contact and the antenna are designed as one component, and by a conductor line system including such a conductor line and such a current collector.

27 Claims, 3 Drawing Sheets (51) Int. Cl.
    *H01B 5/08*     (2006.01)
    *H01P 3/12*     (2006.01)

(58) Field of Classification Search
    CPC . B60M 1/12; B60M 1/13; B60M 1/30; B60M 1/34; B60M 1/36; B60M 3/00
    See application file for complete search history.

(56) References Cited

U.S. PATENT DOCUMENTS

| | | |
|---|---|---|
| 8,419,450 B2 | 4/2013 | Schmiedle et al. |
| 9,716,376 B2 | 7/2017 | Maier et al. |
| 2014/0159968 A1 | 6/2014 | Maier et al. |

FOREIGN PATENT DOCUMENTS

| | | | | |
|---|---|---|---|---|
| DE | 3012790 | 10/1981 | | |
| DE | 3323984 | 1/1985 | | |
| DE | 3505469 | 8/1986 | | |
| DE | 102004008571 | 10/2005 | | |
| DE | 102009024518 | 2/2010 | | |
| DE | 102009024518 A1 * | 2/2010 | ............. | B60L 5/005 |
| DE | 102010048586 | 7/2011 | | |
| DE | 102011002239 | 10/2012 | | |
| DE | 102011119351 | 10/2012 | | |
| DE | 102011108584 | 1/2013 | | |
| DE | 102012002085 | 8/2013 | | |
| JP | S6230429 | 2/1987 | | |
| WO | 2012143506 A2 | 10/2012 | | |

OTHER PUBLICATIONS

Result of examination report for German Application No. 10 2014 107 466.1, filed May 27, 2014.
Written Opinion for PCT/EP2015/056104, filed Mar. 23, 2015.
English translation of International Search Report dated Jun. 3, 2015 for PCT/EP2015/056104, filed Mar. 23, 2015, (2 pages).
English translation of International Preliminary Report dated Nov. 29, 2016, for PCT/EP2015/056104, filed Mar. 23, 2015 (7 pages).
English translation of Written Opinion for PCT/EP2015/056104, filed Mar. 23, 2015 (6 pages).
Indian Examination Report dated Sep. 13, 2018 for Application No. 201637000568, 5 pages.

* cited by examiner

CONDUCTOR LINE, CURRENT COLLECTOR, AND CONDUCTOR LINE SYSTEM

FIELD OF THE INVENTION

The invention concerns a conductor line, a current collector, and a conductor line system.

BACKGROUND OF THE INVENTION

In known conductor line systems, a traveling electrical load travels along a conductor line. To supply the load with electrical power, the load is equipped with a current collector, whose sliding contacts engage conductor strands guided along the conductor line. The load can be, for example, transport gear of a suspended railway, a cable trolley movable on rails, or also so-called E-RTG container cranes, which are equipped with electric traction supplied with electrical power from the conductor line.

In order to be able to transmit data to the load, for example, control data, so-called slotted waveguides or leaky waveguides are guided in known conductor line systems parallel to the conductor strands engaged by antennas arranged on the load.

Thus, DE 10 2004 008 571 B4 discloses a support rail profile of a support rail designed as a double-T support with integrated slotted waveguides for data transmission in a conductor rail arrangement. The slotted waveguide is provided in the lower foot part of the support rail with a longitudinal slot pointing downward into which an antenna of the vehicle traveling along the support rail extends. Power rail holders, with power rails mounted therein, are arranged laterally on the support rails, i.e., rotated by 90° relative to the longitudinal slot.

DE 10 2011 119 351 A1 discloses a transport system with a rail-borne vehicle and rail profile parts of a rail system in which a slotted waveguide is arranged on a rail profile part and two antennas on the vehicle, which are spaced from each other in the rail direction and extend into the slotted waveguides, the rail profile part being designed straight. The slotted waveguide is also arranged there on a double-T support, spaced relative to the current-conducting conductor strands.

DE 10 2011 108 584 B1 discloses a data transmission arrangement with a slotted waveguide, which is fixedly mounted on a stationary installation part in the longitudinal direction. An antenna of a traveling mobile part extends into the longitudinal slot of the slotted waveguide and can be moved with the part lengthwise in the slotted waveguide.

DE 10 2012 002 085 A1 discloses a slotted waveguide for a rail vehicle movable along a rail with a longitudinal slot running laterally. In order to avoid penetration of dust and water into the longitudinal slot of the slotted waveguide, an offset deflection part is arranged on the otherwise 90° tilted T-shaped cavity so that the longitudinal slot is directed vertically downward after the deflection part. The antenna of the rail vehicle then engages the longitudinal slot vertically from below. The electromagnetic waves are, therefore, deflected by the deflection part from the T-shaped cavity profile downward to the longitudinal slot.

The technique of slotted waveguides for data transmission on rail-borne vehicles has long been known and follows, for example, from DE 25 55 909 C3; DE 29 18 178 A1; DE 33 23 984 A1; DE 30 12 790 C1; or also DE 35 05 469 C2 of Messerschmitt-Bölkow-Blohm GmbH and therefore need not be explained in detail.

A problem in slotted waveguides guided parallel to current-transmitting conductor lines is the disturbance in the data transmission in the slotted waveguide by power transmission to the current-conducting conductor line contacts. Since the conductor line contacts cannot always be guided precisely into the current-conducting conductor strands, short contact losses sometimes occur here between the conductor line contacts and the conductor strands, so that electrical current flow is not interrupted because of the small distances between the current conductor contacts and the conductor strands, but is continued through the air. This can lead to disturbances in data transmission. The hollow waveguides are, therefore, generally guided with a spacing relative to the current- and voltage-carrying conductor strands and sliding contacts.

However, this requires more room for mounting of the slotted waveguides, as follows, among others, from DE 10 2004 008 571 B4 and DE 10 2011 119 351 A1.

There is the additional drawback that, especially in conductor lines with conductor strands directed vertically downward and therefore conductor line contacts to be introduced from the bottom up, the movable antenna of the slotted waveguide also engages the usually downwardly opened T-shaped slotted waveguide from below. In order to obtain good data transmission the slot-like opening of the slotted waveguide must then be as narrow as possible. However, this means that only relatively limited deviation of the antenna from the desired average path is permitted in the lateral direction across the travel direction, since otherwise the antenna touches the slotted waveguide, which must be avoided in each case. To avoid this, in many applications the T-shaped slotted waveguide is tilted by 90° and therefore arranged with a horizontal opening slot, as shown in DE 10 2004 008 571 B4 and DE 10 2011 119 351 A1. However, this means that moisture and dirt can more readily collect on the lower opening slot of the slotted waveguide. In many arrangements it is also not possible for design reasons to make the slotted waveguide accessible from the side.

DE 10 2009 024 518 A1 discloses an automation unit in conveyor systems with means for power and data transmission between or from a stationary conductor rail and a mobile transport unit, as well as means to detect and determine the position of the mobile transport unit with reference to the path covered. The automation unit is supposed to reduce the investment and installation expense, in addition to offering greater operating and functional safety. For this purpose the conductor rail is integrated with the means for data transmission and position determination, to which objects for power takeoff, signal/data transmission and path detection are connected on the mobile transport unit.

DE 10 2010 048 586 A1 discloses a system with a rail-borne vehicle in which at least one waveguide is formed in one piece on the rail part for data transmission by excitation of at least one mode of the waveguide range.

SUMMARY OF THE INVENTION

Some embodiments of the invention disclosed provide a conductor line, a current collector and a conductor line system, which overcome the aforementioned drawbacks, and permit compact and material-saving design, as well as good, error-tolerant transmission.

Advantageous modifications of the embodiments of the invention are also disclosed.

The invention solves the task through a conductor line with the features of claim 1, a current collector with the features of claim 12 and a conductor line system with the features of claim 24. Advantageous modifications of the embodiments of the invention are mentioned in the dependent claims.

The conductor line mentioned in the introduction is characterized according to the invention by the fact that the signal transmission device and the conductor profile are designed as an assembly. The conductor line can be made more compact on this account so that production and installation can be simplified and material can be saved. The same applies for the current collector mentioned in the introduction, which is characterized according to the invention by the fact that the sliding contact and the antenna are designed as an assembly. These advantages can be well utilized by a conductor line system equipped with such a conductor line and/or such a current collector.

The signal transmission device can advantageously include an elongated slotted waveguide running in the longitudinal direction with a longitudinal slot for data transmission to and from the load.

As an alternative, the signal transmission device can also include a code rail and a code reading device can be provided on the current collector instead of, or in addition to, the antenna.

The longitudinal slot and a contact opening of the conductor strand can then preferably point in the same direction to accommodate the sliding contact, or the sliding contact and the antenna point in the same direction perpendicular to the longitudinal direction. The sliding contact and antenna can then advantageously be arranged on a common feed mechanism for joint movement from and to the conductor profile or the longitudinal slot of the slotted waveguide.

The conductor profile can advantageously have at least one sliding surface for a correspondingly shaped and aligned sliding contact surface of the sliding contact across the longitudinal direction next to the longitudinal slot, which can be arranged across the longitudinal direction next to the antenna and electrically insulated from it. In an advantageous modification, the conductor profile can also have sliding surfaces across the longitudinal direction on both slides of the longitudinal slot for correspondingly shaped and aligned sliding contact surfaces of two sliding contacts arranged on both sides of the antenna and electrically insulated from the antenna.

By appropriate formation of the sliding surfaces and the corresponding sliding contact surfaces, a self-centering effect can be achieved so that travel deviations can be reduced across the longitudinal direction. With only one sliding contact, the sliding contact surface can preferably be wedge-shaped or rounded and the corresponding sliding surface V-shaped or rounded. With further preference, the sliding contact surfaces in the sliding contacts arranged on both sides can be sloped and/or rounded opposite to each other and the sliding surfaces correspondingly sloped and/or rounded oppositely. This again produces a combination of V-shaped or rounded sliding surfaces and wedge-shaped or rounded sliding contact surfaces or vice versa.

In another embodiment, the longitudinal slot and the antenna or part of it can be fully or partially tilted relative to a travel plane in which the current collector carriage or the current collector is movable with its sliding contacts in the longitudinal direction by an angle α not equal to 90° around the longitudinal direction, in which case angle α is greater than or equal to 0°, preferably greater than 0° and less than 90°. In an advantageous modification, an end of the antenna extending into the longitudinal slot of the slotted waveguide can then be offset by the angle α. The longitudinal slot and a contact opening of the conductor strand can also be tilted by the angle α relative to each other to accommodate the sliding contact. The conductor line can be made more compact on this account and travel deviations occurring in a travel plane running in the longitudinal direction can also be better compensated.

In a material-saving embodiment that is favorable in terms of manufacture, the slotted waveguide and the conductor profile can be made in one piece from an electrically conducting material.

The conductor strand can be a grounding conductor strand for a grounding sliding contact and/or at least one additional conductor strand, especially a phase conductor strand, can be provided in addition to the conductor strand.

The sliding contact and the antenna can also advantageously run parallel to each other and/or be arranged in the longitudinal direction next to each other or one behind the other. Two antennas can also advantageously be arranged one behind the other in the longitudinal direction.

The traveling electrical load in the conductor line system according to the invention can preferably have several sliding contacts for contacting with corresponding conductor profiles of the conductor line, in which case at least one conductor profile forms a grounding conductor and/or protective conductor.

BRIEF DESCRIPTION OF THE DRAWINGS

The invention is described below with reference to detailed practical example relative to the accompanying drawings. The drawings show.

DETAILED DESCRIPTION OF THE INVENTION

Figure 1:
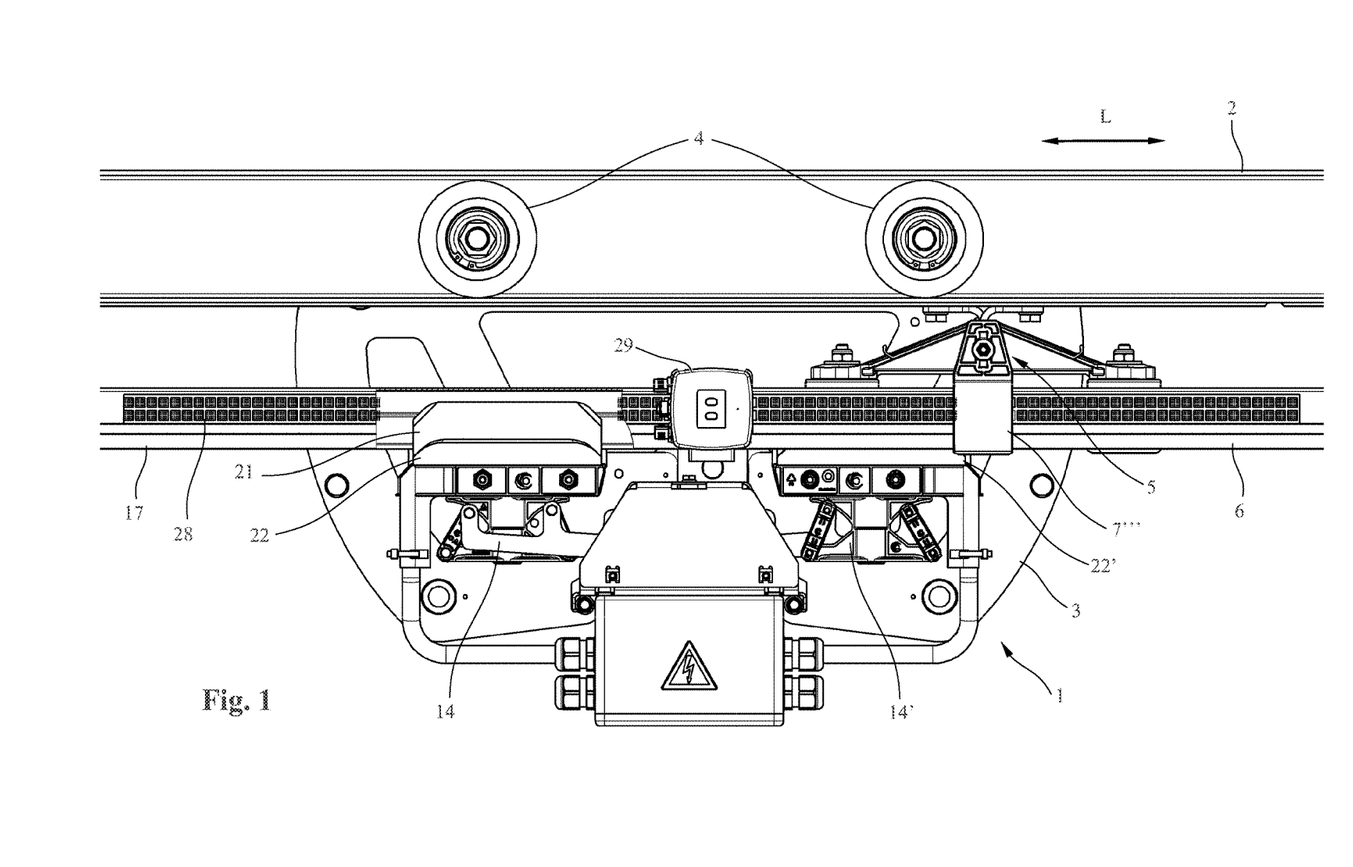
FIG. 1 a side view of a section of the conductor line system according to the invention.

FIG. 1 shows a side view of a section of a conductor line system 1 according to the invention with an essentially double U-shaped rail line 2. A current collector 3 of an electrical load (not shown) with track rollers 4 can be moved in a longitudinal direction L on the rail line 2. The current collector 3 serves to supply the electrical load movable along the rail line 2, for example, a container crane.

A conductor line 6 is mounted suspended downwardly on the lower side of the rail line 2 by means of conductor line mounts 5 positioned at spaced-apart locations in the longitudinal direction L of the rail line 2. The conductor line 6 has three conductor strand mounts 7, 7' and 7" arranged next to each other, readily apparent in FIGS. 2 to 5, for mounting of elongated phase conductor strands 8, 8' and 8". Since the phase conductor strands 8' and 8" are designed identically to the phase conductor strand 8, the comments made relative to the phase conductor strand 8 apply accordingly.

Figure 2:
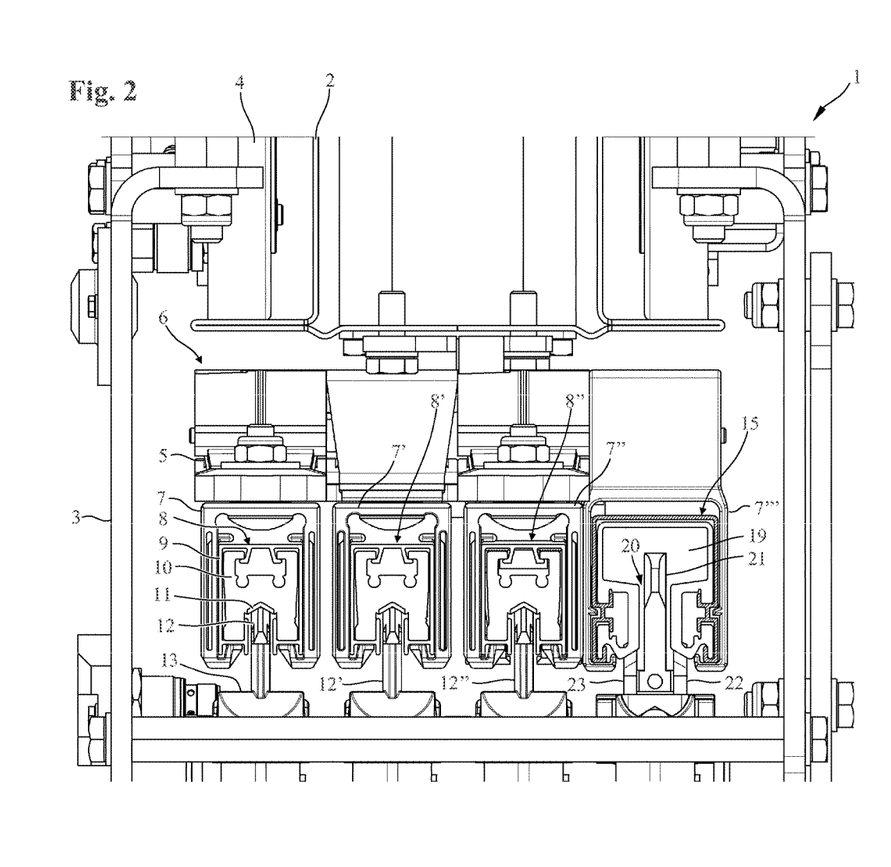
FIG. 2 a front sectional view of the conductor line system from FIG. 1.

The phase conductor strand 8 has an elongated insulation profile 9, which is held by the conductor strand mount 7. An elongated electrically conducting phase conductor profile 10 with an electrically conducting elongated sliding surface 11, preferably made of aluminum or steel, is then inserted into the insulation profile 9.

A sliding contact 12, which is arranged on a sliding contact support 13 of the current collector 3, slides on the sliding surface 11. The sliding contact support 13 with sliding contact 12 can be moved, in known fashion via a known feed mechanism 14 depicted as an example in FIG. 1, toward and away from the sliding surface 11. During operation, the sliding contact 12 is continuously forced against the sliding surface 11, for example, via a spring force. Additional sliding contacts 12' and 12", depicted in FIG. 2 with corresponding sliding contact supports, are largely identical to the sliding contact 12 and sliding contact support 13 so that the comments made in this respect apply accordingly. In particular, each sliding contact 12, 12' and 12" has its own feed mechanism 14.

The phase conductor strand 8 serves as the power supply for the traveling load and in normal operation is under voltage so that the current flows to the sliding contact 12 via the sliding surface 11. The design described above is essentially known to one skilled in the art and requires no further comments.

A grounding conductor strand 15 for connection of the traveling electrical load to the ground potential of the conductor line system 1 is also ordinarily provided in such a conductor line system 1. The grounding conductor strand 15 is described below mostly with reference to the detailed drawing in FIG. 2a.

Figure 2A:
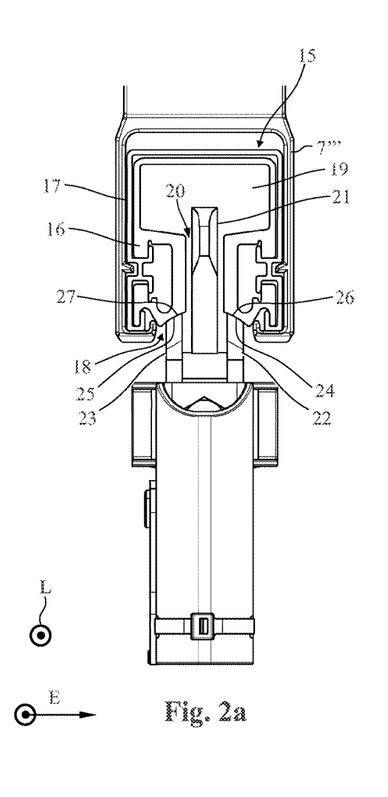
FIG. 2a a detailed view of a portion of the conductor line system from FIG. 2.

The grounding conductor strand 15 has an electrically conducting grounding conductor profile 16 for this purpose, which is surrounded by an essentially U-shaped grounding insulation profile 17 with a downwardly open contact opening 18 in FIG. 2a. The grounding conductor strand 15 is fastened to the conductor line 6 with a conductor strand mount 7''', like the phase conductor strands 8, 8', 8".

The grounding conductor profile 16 at the same time forms an essentially T-shaped slotted waveguide 19 with a downwardly opening longitudinal slot 20. The longitudinal slot 20 then points in the same direction as the downwardly open contact opening 18.

An antenna 21, again aligned in longitudinal direction L, which engages the cavity of the slotted waveguide 19, extends through the longitudinal slot 20. As is readily apparent in FIGS. 1 to 2a, the antenna 21 is flanked on both sides by a right grounding sliding contact 22 and a left grounding sliding contact 23, the antenna 21 being electrically insulated from the grounding sliding contacts 22, 23. The antenna 21 and the grounding sliding contacts 22, 23 can be lifted by the feed mechanism 14 and, thus, brought into contact with the grounding conductor profile 16 and held there, as already described above.

The grounding sliding contacts 22, 23 are symmetric and run parallel to antenna 21. The grounding sliding contacts 22, 23, depicted in FIG. 2, on their upper ends have grounding sliding contact surfaces 24, 25 sloped obliquely outward, which are forced against the correspondingly sloped sliding surfaces 26, 27 of the grounding conductor profile 16 with the feed mechanism 14. Centering of the antenna 21 in the longitudinal slot 20 of the slotted waveguide 19 is, thus, automatically achieved. If the antenna 21, for example, tilts somewhat around the longitudinal direction L, the sloped grounding sliding contact surfaces 24, 25 lose complete contact with the sliding surfaces 26, 27. Owing to the sloped surfaces 24 to 27 and the contact pressure, the grounding sliding contact surfaces 24, 25 and the sliding surfaces 26, 27, however, are again moved toward each other until they again lie against each other over the entire surface. In the detailed view depicted in FIG. 2a, the grounding sliding contact surfaces 24, 25 and the sliding surfaces 26, 27 in the embodiment depicted in FIG. 1 are not only sloped, but also slightly rounded in order to further facilitate sliding back into the centered position during tilting of antenna 1 around the longitudinal direction L.

Since no electrical power is transmitted in normal operation via the grounding sliding contacts 22, 23, there is no hazard that arcing will occur between the grounding conductor profile 16 and the grounding sliding contacts 22, 23, which would adversely affect data transmission by means of slotted waveguide 19 and antenna 21. If larger currents flow, this involves an emergency, in which case the conductor line system 1 should be rapidly shut down.

Grounding conductor profile 16 and slotted wave guide 19 are made in one piece from the same material and, therefore, form an assembly so that manufacture and installation can be simplified. However, grounding conductor profile 16 and slotted waveguide 21 can also be made from separate parts and/or different materials. The slotted waveguide 19 can also have a different appropriate cross section.

By integration of the slotted waveguide 19 into the grounding conductor strand 15 and the grounding conductor profile 16, the conductor line 6 can be made very compact, so that space-consuming suspensions separate from each other need not be provided for a grounding conductor strand and a slotted waveguide. The conductor line 6 can, therefore, be made smaller and requires less material, and assembly is also simplified.

The embodiment of the invention depicted in FIGS. 2 and 2a permits not only compact design, but also ensures an antenna 21 guided as well as possible in the slotted waveguide 19 and longitudinal slot 20 and, therefore, good and reliable data transmission. In addition, the antenna 21 and the grounding sliding contacts 22, 23 can be simply moved in and out of the longitudinal slot 20 and the slotted waveguide 19 or grounding conductor profile 16.

In order to further improve the reliability of the conductor line system 1, it can be prescribed, as in the embodiment depicted in FIG. 1, that an additional antenna with lateral grounding sliding contacts 22' be arranged on an additional feed mechanism 14'. Interruption, for example, by a thermally separated connection site of the grounding conductor profile 16 and slotted waveguide 19 not formed from endless material can be bridged without interrupting data transmission.

A known elongated code band 28, depicted in FIG. 1, can also be arranged laterally on the grounding insulation profile 17, which can be read out via a known reading unit 29 mounted on the current collector 3 and the position can therefore be determined.

Figure 3:
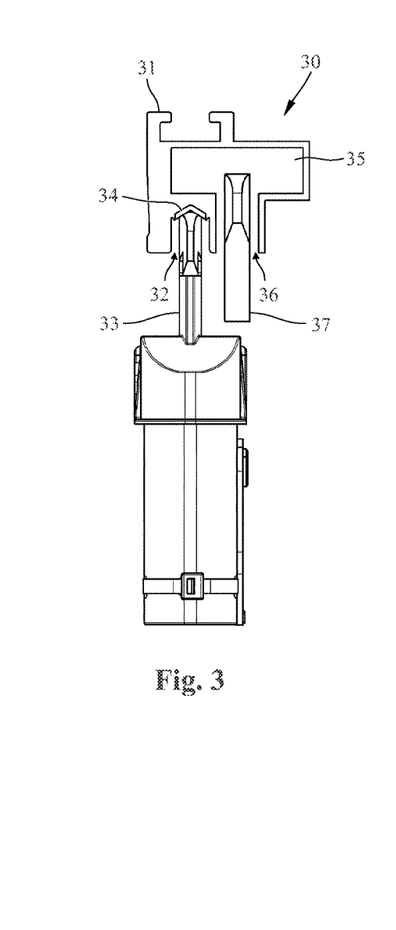
FIG. 3 a front, sectional view of an alternative embodiment of the conductor line system from FIG. 1.

FIG. 3 shows an alternative embodiment of a grounding conductor strand 30. The same reference numbers and designations are used in the same or corresponding parts and the above comments apply accordingly. For reasons of clarity a grounding conductor insulation profile was not shown On an alternative grounding conductor profile 31 a contact opening 32 is provided, through which the grounding sliding contact 33 of the current collector 3 engages. The grounding sliding contact 33 slides on a sliding surface 34 of the grounding conductor profile 31. The grounding conductor strand 30 and the grounding sliding contact 33 can be designed like the phase conductor strands 8, 8', 8" and the sliding contacts 12 provided for power transmission.

A known elongated T-shaped slotted waveguide 35 running in the longitudinal direction L with a downwardly facing longitudinal slot 36 is integrated in the grounding conductor profile 31. An antenna 37 arranged on the movable load or current collector 3 engages the longitudinal slot 36 in order to permit known data transmission.

Grounding conductor profile 31 and slotted waveguide 35, which are made in the present case in one piece from the same material, again form an assembly so that manufacture and installation can be simplified. However, they can again be made from separate parts and/or different materials. The slotted waveguide 35 can also have a different appropriate cross section, as known in the prior art.

By integration of the slotted waveguide 35 in the grounding conductor strand 30 and the grounding conductor profile 31, the conductor line 6 can again be very compact so that no space-consuming suspensions separate from each other need be provided. The conductor line 6 can, therefore, be made smaller and less material is required.

Figure 4:
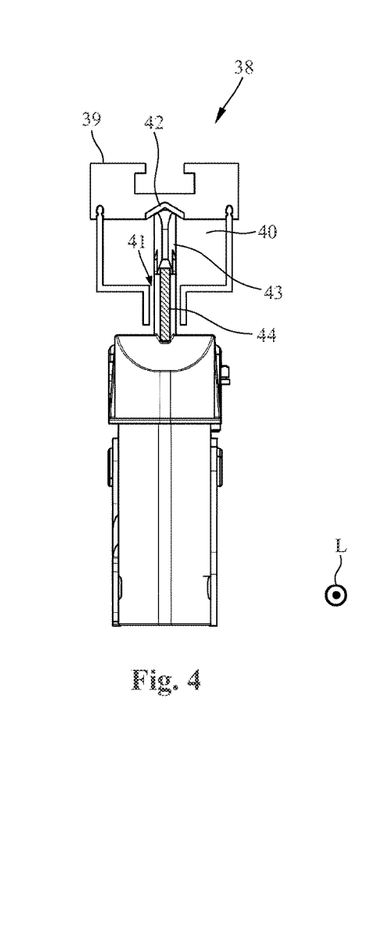
FIG. 4 a front, sectional view of another alternative embodiment of the conductor line system from FIG. 1.

The alternative embodiment depicted in FIG. 4 differs from the embodiment depicted in FIG. 3 essentially by the alternative design of a grounding conductor strand 38. The same reference numbers and designations are used for the same or corresponding parts and the above comments apply accordingly.

A grounding conductor profile 39 of the grounding conductor strand 38 already forms an essentially T-shaped slotted waveguide 39 with a downwardly open longitudinal slot 41. A sliding surface 42 for a grounding sliding contact 43 is then arranged on the roof of the cavity of the slotted waveguide 40. An antenna 44, arranged offset relative to the longitudinal direction L to the grounding sliding contact 43, is also provided, which is schematically indicated in FIG. 4. The antenna 44 can be raised and lowered with the feed mechanism 14 together with the grounding sliding contact 43, as in the previously described embodiments.

Figure 5:
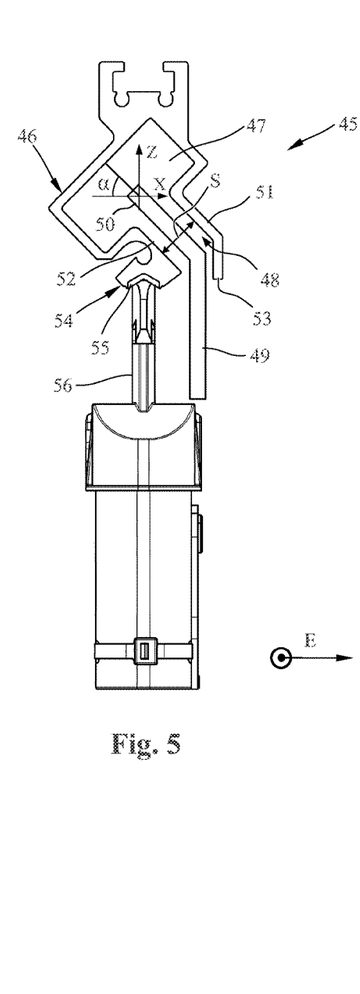
FIG. 5 a front, sectional view of another alternative embodiment of the conductor line system from FIG. 1.

FIG. 5 shows another alternative embodiment of a grounding conductor strand 45. The same reference numbers and designations are used for the same or corresponding parts and the above comments apply accordingly.

In the embodiment depicted in FIG. 5, additional space can be saved and a more compact design achieved, in which the grounding conductor profile 46 has an essentially T-shaped slotted waveguide 47, which is tilted around the longitudinal direction L by an angle α not equal to 90° relative to a travel plane E in which the current collector 3 travels. In particular, a longitudinal slot 48 of the slotted waveguide 47 is also tilted around angle α and therefore extends obliquely downward and outward to the right at angle α in FIG. 5.

An offset antenna 49 is then preferably used, whose front antenna end 50, important for data transmission, is offset according to the tilt angle α of the slotted waveguide 47. The antenna end 50 then engages, in the desired manner, through the tilted longitudinal slot 48 into the cavity of the slotted waveguide 47 so that there are no disadvantages for data transmission. Because of the offset antenna 49, the antenna end 50 again runs in the line of symmetry of the T-shaped slotted waveguide 47.

An upper slot wall 51 of longitudinal slot 48 in FIG. 5 forms a cover for the longitudinal slot 48 and the opposite lower shorter slot wall 52 [forms a cover] against soiling from rain, dust and other influences. In an advantageous embodiment depicted in FIG. 5 the upper slot wall 51 can be lengthened downward by a downward offset wall 53 in order to provide additional protection for the slotted waveguide 47 and antenna 49. This wall 53, however, is not absolutely necessary in order to achieve the success of the tilted slotted waveguide 47 according to the invention. Instead of the offset wall 53 the upper slot wall 51 can also be lengthened straight so that it extends beyond the lower slot wall 52. The offset slot wall 53 can also be fully omitted so that both slot walls 51, 52 are equally long.

A widened somewhat elastic section 54, relative to slotted waveguide 47 of the grounding insulation profile 46, is provided on the lower slot wall 52. A sliding surface 55 for the grounding sliding contact 56 is provided on section 54. The grounding sliding contact 56 can be moved to and from the sliding surface 55 via its own feed mechanism 14, as the sliding contacts 12, 12' and 12".

The embodiment according to FIG. 5 has the additional advantage that the otherwise small tolerances for movement of antenna 49 in an X direction running across the longitudinal direction L are increased. The X direction then also runs parallel to a travel plane E, in which the current collector 3 is moved. Ordinarily, feed of the sliding contacts 12, 12', 12" and the grounding sliding contact 56 then occurs in the height direction Z perpendicular to travel plane E. In the embodiments depicted here, the travel plane E runs horizontally in the drawings and is therefore spanned by longitudinal direction L in the X direction. In the conductor lines shown in DE 10 2004 008 571 B4 and DE 10 2011 119 351 A1 with conductor strands facing sideward, the travel plane, on the other hand, runs vertically, since the sliding contacts there are moved against the conductor strands from the side.

Since the longitudinal slot 48 with its narrow width S is tilted by angle α, the tolerance for movements of antenna 49 in travel plane E and especially in the X direction is increased according to the invention. Touching of the walls 51, 52 of the longitudinal slot 48 by antenna 49 can be even better avoided on this account.

In addition, a different data and/or signal transmission device can be provided on the grounding conductor strand instead of the different slotted waveguides described above, since then the advantages of the compact, material-saving and simple-to-install assembly also apply.

LIST OF REFERENCE NUMBERS

1 Conductor line system
2 Rail line
3 Current collector
4 Track rollers
5 Conductor line mounts
6 Conductor line
7, 7', 7" Conductor strand mounts
8, 8', 8" Phase conductor strands
9 Insulation profile
10 Phase conductor profile
11 Sliding surface phase conductor strand
12, 12', 12" Sliding contact
13 Sliding contact support
14 Feed mechanism
15 Grounding conductor strand
16 Grounding conductor profile
17 Grounding insulation profile
18 Contact opening grounding insulation profile
19 Slotted waveguide
20 Longitudinal slot
21 Antenna
22 Right grounding sliding contact
23 Left grounding sliding contact
24 Right sloped grounding sliding contact surface 25 Left sloped grounding sliding contact surface
26 Right sloped and optionally rounded sliding surface
27 Left sloped and optionally rounded sliding surface
28 Code band
29 Reading unit
30 Alternative grounded conductor strand
31 Alternative grounding conductor profile
32 Contact opening grounding conductor strand
33 Grounding sliding contact
34 Sliding surface grounding conductor profile
35 Slotted waveguide
36 Longitudinal slot
37 Antenna
38 Alternative grounding conductor strand
39 Grounding conductor profile
40 Slotted waveguide
41 Longitudinal slot
42 Sliding surface grounding conductor profile
43 Grounding sliding contact
44 Antenna
45 Alternative grounding conductor strand
46 Grounding conductor profile
47 Tilted slotted waveguide
48 Tilted longitudinal slot
49 Offset antenna
50 Offset antenna end
51 Upper slot wall
52 Lower slot wall
53 Offset upper slot wall
54 Elastic section
55 Sliding surface grounding conductor profile
56 Grounding sliding contact
E Travel plane current collector
L Longitudinal direction conductor line
S Width of the longitudinal slot
X Direction across longitudinal direction in the travel plane
Z Height direction perpendicular to the travel plane

The invention claimed is:
1. A conductor line for supplying at least one electrical load traveling on the conductor line in a longitudinal direction with electrical power, the conductor line comprising:
   at least one conductor strand running in the longitudinal direction;
   an electrically-conducting conductor profile for contacting a sliding contact of the at least one electrical load; and
   at least one signal transmission device running in the longitudinal direction, the at least one signal transmission device including an elongated, slotted waveguide;
   wherein the elongated, slotted waveguide and the electrically-conducting conductor profile are designed and formed as one component from an electrically-conducting material.
2. The conductor line according to claim 1, wherein the at least one signal transmission device further includes a longitudinal slot for transmission of data to and from the at least one electrical load, the longitudinal slot and a contact opening of the at least one conductor strand arranged to point in a same direction to accommodate the sliding contact of the at least one electrical load.
3. The conductor line according to claim 2, wherein the electrically-conducting conductor profile includes at least one sliding surface for contacting a corresponding sliding contact surface on the sliding contact across the longitudinal direction positioned next to at least one side of the longitudinal slot.
4. The conductor line according to claim 3, wherein the electrically-conducting conductor profile includes sliding surfaces for contacting corresponding sliding contact surfaces on the sliding contact across the longitudinal direction positioned next to both sides of the longitudinal slot.
5. The conductor line according to claim 4, wherein each of the sliding surfaces is at least one of sloped and rounded opposite to each other.
6. The conductor line according to claim 1, wherein the at least one conductor strand is a grounding conductor strand for a grounding sliding contact or the conductor line further comprises a phase conductor strand.
7. The conductor line according to claim 1, wherein the at least one conductor strand is a grounding conductor strand for a grounding sliding contact and the conductor line further comprises a phase conductor strand.
8. A current collector for at least one electrical load moving along a conductor line in a longitudinal direction, the current collector comprising:
   at least one sliding contact for contacting an electrically-conductive conductor profile of a conductor strand of the conductor line; and
   at least one antenna movable in the longitudinal direction, the at least one antenna for transmitting data to a signal transmission device of the conductor line;
   wherein the at least one sliding contact and the at least one antenna are designed and formed as an assembly.
9. The current collector according to claim 8, wherein the signal transmission device includes an elongated, slotted waveguide with a longitudinal slot.
10. The current collector according to claim 8, wherein the at least one sliding contact and the at least one antenna are arranged to point in a same direction perpendicular to the longitudinal direction.
11. The current collector according to claim 8, wherein the at least one sliding contact and the at least one antenna are arranged on a common feed mechanism, the feed mechanism for joint movement of the at least one sliding contact and the at least one antenna from and to the electrically-conductive conductor profile of the conductor strand and a longitudinal slot of a signal transmission device.
12. The current collector according to claim 8, wherein the at least one sliding contact and the at least one antenna run parallel to each other.
13. The current collector according to claim 8, wherein the at least one sliding contact and the at least one antenna are arranged next to each other or are arranged one behind the other in the longitudinal direction.
14. The current collector according to claim 8, wherein the at least one antenna includes a first antenna and a second antenna with the second antenna arranged behind the first antenna in the longitudinal direction.
15. A conductor line system for supplying at least one electrical load moving along a conductor line in a longitudinal direction with electrical power, the conductor line system comprising:
   a) a conductor line having:
      at least one conductor strand running in the longitudinal direction;
      an electrically-conducting conductor profile for contacting a sliding contact of the at least one electrical load; and
      at least one signal transmission device running in the longitudinal direction; and
   b) a current collector having:

at least one sliding contact for contacting the electrically-conductive conductor profile of the conductor strand of the conductor line; and at least one antenna movable in the longitudinal direction, the at least one antenna for transmitting data to the signal transmission device of the conductor line;

wherein the electrically-conducting conductor profile and the at least one signal transmission device of the conductor line are designed and formed as an assembly; and wherein the at least one sliding contact and the at least one antenna of the current collector are designed and formed as an assembly.

16. The conductor line system according to claim 15, wherein the at least one signal transmission device includes an elongated, slotted waveguide running in the longitudinal direction and a longitudinal slot for transmission of data to and from the at least one electrical load.

17. The conductor line according to claim 15, further comprising a grounding conductor or a protective conductor formed by contact of the electrically-conducting conductor profile with sliding contacts of the at least one electrical load.

18. A conductor line for supplying at least one electrical load traveling on the conductor line in a longitudinal direction with electrical power, the conductor line comprising:

at least one conductor strand running in the longitudinal direction;

an electrically-conducting conductor profile for contacting a sliding contact of the at least one electrical load; and at least one signal transmission device running in the longitudinal direction; the at least one signal transmission device including an elongated, slotted waveguide running in the longitudinal direction and a longitudinal slot for transmission of data to and from the at least one electrical load;

wherein the electrically-conducting conductor profile and the at least one signal transmission device are designed as an assembly; and wherein the elongated, slotted waveguide and the electrically-conducting conductor profile are designed as one component and formed from an electrically-conducting material.

19. The conductor line according to claim 18, wherein the electrically-conducting conductor profile includes at least one sliding surface for contacting a corresponding sliding contact surface on the sliding contact across the longitudinal direction positioned next to at least one side of the longitudinal slot.

20. The conductor line according to claim 19, wherein the electrically-conducting conductor profile includes sliding surfaces for contacting corresponding sliding contact surfaces on the sliding contact across the longitudinal direction positioned next to both sides of the longitudinal slot.

21. The conductor line according to claim 20, wherein the sliding surfaces are at least one of sloped and rounded opposite to each other.

22. A current collector for at least one electrical load moving along a conductor line in a longitudinal direction, the current collector comprising:

at least one antenna movable in the longitudinal direction, the at least one antenna for transmitting data to a signal transmission device of the conductor line; and at least one sliding contact arranged across the longitudinal direction next to and insulated from the at least one antenna, the at least one sliding contact having a sliding contact surface for contacting a corresponding sliding contact surface on an electrically-conductive conductor profile of a conductor strand of the conductor line;

wherein the at least one antenna and the at least one sliding contact are designed and formed as an assembly.

23. The current collector according to claim 22, wherein the signal transmission device includes an elongated slotted waveguide with a longitudinal slot.

24. The current collector according to claim 22, wherein the at least one sliding contact and the at least one antenna are arranged to point in a same direction perpendicular to the longitudinal direction.

25. The current collector according to claim 22, wherein the at least one sliding contact comprising a first sliding contact and a second sliding contact, with the second sliding contact arranged across the longitudinal direction opposite of and insulated from the at least one antenna, the second sliding contact having a sliding contact surface for contacting a corresponding sliding contact surface on an electrically-conductive conductor profile of a conductor strand of the conductor line.

26. The current collector according to claim 25, wherein the sliding contact surfaces of the first and second sliding contacts are at least one of sloped or rounded opposite to each other.

27. A conductor line system for supplying at least one electrical load moving along a conductor line in a longitudinal direction with electrical power, the conductor line system comprising:

a) a conductor line having:
a code rail; and
b) a current collector having:
a code-reading device for determining position;
at least one sliding contact for contacting the electrically-conductive conductor profile of the conductor strand of the conductor line; and
at least one antenna for transmitting data to the signal transmission device of the conductor line;
wherein the electrically-conducting conductor profile and the at least one signal transmission device of the conductor line are designed and formed as an assembly; and
wherein the at least one sliding contact and the at least one antenna of the current collector are designed and formed as an assembly.

* * * * *

UNITED STATES PATENT AND TRADEMARK OFFICE
CERTIFICATE OF CORRECTION

PATENT NO. : 10,137,801 B2  
APPLICATION NO. : 14/898622  
DATED : November 27, 2018  
INVENTOR(S) : Michael Eckle et al.

Page 1 of 1

It is certified that error appears in the above-identified patent and that said Letters Patent is hereby corrected as shown below:

On the Title Page

Item (71), should read:  
(71) Applicant: CONDUCTIX-WAMPFLER GMBH

Signed and Sealed this  
Twenty-sixth Day of March, 2019

Andrei Iancu  
*Director of the United States Patent and Trademark Office*